(12) United States Patent
Al-Anbuky et al.

(10) Patent No.: US 8,040,110 B2
(45) Date of Patent: Oct. 18, 2011

(54) STRESS MANAGEMENT OF BATTERY RECHARGE, AND METHOD OF STATE OF CHARGE ESTIMATION

(75) Inventors: Adnan Al-Anbuky, Christchurch (NZ); Phillip Mark Hunter, Christchurch (NZ)

(73) Assignee: Eaton Power Quality Company, Christchurch (NL)

( * ) Notice: Subject to any disclaimer, the term of this patent is extended or adjusted under 35 U.S.C. 154(b) by 2002 days.

(21) Appl. No.: 10/477,534

(22) PCT Filed: May 14, 2002

(86) PCT No.: PCT/NZ02/00097
§ 371 (c)(1),
(2), (4) Date: Jun. 21, 2004

(87) PCT Pub. No.: WO02/093712
PCT Pub. Date: Nov. 21, 2002

(65) Prior Publication Data
US 2004/0222769 A1 Nov. 11, 2004

(30) Foreign Application Priority Data
May 14, 2001 (NZ) ........................................ 511701

(51) Int. Cl.
*H02J 7/00* (2006.01)
(52) U.S. Cl. ....................................................... 320/150
(58) Field of Classification Search .................. 320/150, 320/145, 139, 153–154
See application file for complete search history.

(56) References Cited

U.S. PATENT DOCUMENTS

| 4,677,363 A | 6/1987 | Kopmann ......................... 320/44 |
| 4,876,513 A | 10/1989 | Brilmyer et al. ............... 324/427 |
| 4,952,862 A | 8/1990 | Biagetti et al. .................. 320/48 |
| 5,130,659 A | 7/1992 | Sloan ............................. 324/435 |
| 5,214,385 A | 5/1993 | Gabriel et al. ................ 324/434 |
| 5,371,682 A | 12/1994 | Levine et al. .................. 364/483 |
| 5,444,353 A | 8/1995 | Shinohara et al. ............ 320/148 |
| 5,498,950 A | 3/1996 | Ouwerkerk ................... 320/119 |
| 5,563,496 A * | 10/1996 | McClure ....................... 320/128 |

(Continued)

FOREIGN PATENT DOCUMENTS
DE      37 36 069 C2    5/1989
(Continued)

OTHER PUBLICATIONS

Rakow et al., "The Design and Development of Smex-Lite Power Systems", Sep. 1995, vol. SSC98-VIII-3, OSC, pp. 1-13.*

(Continued)

*Primary Examiner* — Edward Tso
*Assistant Examiner* — Samuel Berhanu
(74) *Attorney, Agent, or Firm* — Myers Bigel Sibley & Sajovec, P.A.

(57) ABSTRACT

One or more cells are charged by measuring one or more cell parameters or changes in said cell parameters, inputting the measured cell parameter(s) or changes in cell parameters into a state of charge estimation model, obtaining a state of charge of the cell(s) from the state of charge estimation model, selecting an allowable temperature rise for the cell(s), determining a charge parameter in accordance with the state of charge of the cell(s) and in accordance with the selected allowable temperature rise for the cell(s), and supplying energy to the cell(s) in accordance with the determined charge parameter. The invention may be embodied as methods, apparatus and computer program products.

16 Claims, 14 Drawing Sheets

U.S. PATENT DOCUMENTS

| | | | | |
|---|---|---|---|---|
| 5,587,660 | A | 12/1996 | Chabbert et al. | 324/426 |
| 5,587,924 | A | 12/1996 | Rossi | 364/496 |
| 5,619,417 | A | 4/1997 | Kendall | 364/483 |
| 5,656,915 | A | 8/1997 | Eaves | 320/118 |
| 5,663,626 | A | 9/1997 | D'Angelo et al. | 318/799 |
| 5,680,031 | A * | 10/1997 | Pavlovic et al. | 320/145 |
| 5,703,464 | A | 12/1997 | Karunasiri et al. | 320/125 |
| 5,714,866 | A * | 2/1998 | S et al. | 320/152 |
| 5,739,673 | A * | 4/1998 | Le Van Suu | 320/139 |
| 5,773,956 | A | 6/1998 | Wieczorek | 320/30 |
| 5,773,962 | A | 6/1998 | Nor | 320/134 |
| 5,786,640 | A | 7/1998 | Sakai et al. | 290/17 |
| 5,822,495 | A | 10/1998 | Wang et al. | 395/3 |
| 5,825,156 | A | 10/1998 | Patillon et al. | 320/21 |
| 5,945,808 | A * | 8/1999 | Kikuchi et al. | 320/132 |
| 6,011,379 | A | 1/2000 | Singh et al. | 320/132 |
| 6,064,180 | A | 5/2000 | Sullivan et al. | 320/132 |
| 6,094,033 | A | 7/2000 | Ding et al. | 320/132 |
| 6,104,967 | A | 8/2000 | Hagen et al. | 700/293 |
| 6,111,389 | A * | 8/2000 | Aranovich et al. | 320/150 |
| 6,150,795 | A | 11/2000 | Kutkut et al. | 320/118 |
| 6,191,560 | B1 * | 2/2001 | Sakakibara | 320/150 |
| 6,204,640 | B1 * | 3/2001 | Sakakibara | 320/150 |
| 6,211,655 | B1 * | 4/2001 | Hardie | 320/150 |
| 6,225,786 | B1 * | 5/2001 | Muramatsu et al. | 320/150 |
| 6,255,801 | B1 | 7/2001 | Chalasani | 320/132 |
| 6,274,950 | B1 | 8/2001 | Gottlieb et al. | 307/1.66 |
| 6,281,663 | B1 * | 8/2001 | Yagi et al. | 320/150 |
| 6,329,792 | B1 * | 12/2001 | Dunn et al. | 320/132 |
| 6,424,119 | B1 | 7/2002 | Nelson et al. | 320/116 |
| 6,456,988 | B1 | 9/2002 | Singh et al. | 706/2 |
| 6,476,584 | B2 * | 11/2002 | Sakakibara | 320/150 |
| 6,624,615 | B1 * | 9/2003 | Park | 320/150 |
| 2005/0071699 | A1 * | 3/2005 | Hammond et al. | 713/300 |

FOREIGN PATENT DOCUMENTS

| | | |
|---|---|---|
| DE | 621990 * | 12/1992 |
| EP | 0621990 | 12/1992 |
| EP | 0 714 033 | 5/1996 |
| EP | 0 966 089 A2 | 12/1999 |
| EP | 1 039 612 A3 | 11/2001 |
| FR | 2 734 061 | 11/1996 |
| GB | 2 413 226 A | 10/2005 |
| WO | WO-9314548 * | 7/1993 |
| WO | WO96/15563 | 5/1996 |
| WO | WO98/32181 | 7/1998 |
| WO | WO98/40950 | 9/1998 |
| WO | WO 99/01918 | 1/1999 |
| WO | WO99/27628 | 6/1999 |
| WO | WO99/34224 | 7/1999 |
| WO | WO 01/82260 A2 | 11/2001 |
| WO | 02/093712 A2 | 11/2002 |
| WO | WO02/093712 A3 | 11/2002 |

OTHER PUBLICATIONS

Martin et al., "A Micro-controller-Based Intelligent Fast-Charger for Ni-Cd and Ni-MH Batteries in Portable Applications", 1998, IEEE, pp. 1638-1643.*

Dahlman et al.,"A Microprocessor Based Intelligent Battery Charger", 1994, IEEE, pp. 185-190.*

Bordeaux, "Portable Power Management: A Holistic Perspective", 2002, Intersil, pp. 1-9.*

"IEEE Recommended Practice for Maintenance, Testing, and Replacement of Valve-Regulated Lead-Acid (VRLA) Batteries for Stationary Applications," IEEE Std 1188-1996, 16 pages.

Alber et al., "Impedance Testing—Is it a Substitute for Capacity Testing," INTELEC 1994, 10-1, pp. 245-249.

Anbuky et al., "Knowledge Based VRLA Battery Monitoring and Health Assessment," IEEE, 2000, pp. 687-694.

Cun et al., "The Experience of a UPS Company in Advanced Battery Monitoring," INTELEC 1996, 22-5, pp. 646-653.

International Search Report, PCT/NZ01/00183, Jul. 23, 2002.

International Search Report, PCT/NZ01/00182, May 29, 2002.

Konya et al., "A Deterioration Estimating System for 200-Ah Sealed Lead-Acid Batteries," 1994 IEEE, pp. 256-262.

Kurisawa et al., "Capacity Estimating Method of Lead-Acid Battery by Short-time Discharge," INTELEC 1997, pp. 493-490.

Kurisawa et al., "Internal Resistance and Deterioration of VRLA Battery Analysis of Internal Resistance Obtained by Direct Current Measurement and its Application to VRLA Battery Monitoring Technique," INTELEC 1997, 29-3, pp. 687-694.

Markle, Gary J., "AC Impedance Testing for Valve Regulated cell," INTELEC 1992, 9-4, pp. 212-217.

Ng et al., "Evaluation of a Reverse Time Prediction Algorithm for Lead Acid Battery," INTELEC 1996, pp. 616-623.

Pascoe et al., "Estimation of VRLA Battery Capacity Using The Analysis of The Coup De Fouet Region," 1999 IEEE, 9 pages.

Pascoe et al., "VRLA Battery Capacity Measurement and Discharge Reserve Time Prediction," 1998 IEEE, pp. 302-310.

Suntio et al., "The Batteries as a Principal Component in DC UPS Systems," IEEE, 1990, pp. 400-411.

Supplementary European Search Report, EP 99 94 0753, Jun. 25, 2002.

Gotaas et al., "Single Cell Battery Management Systems (BMS)," Intelec 2000, Sep. 10-14, 2000, Phoenix, USA, Paper 36.2, pp. 695-702.

Anbuky et al., "Knowledge Based VRLA Battery Monitoring & Health Assessment," Intelec 2000, Sep. 10-14, 2000, Phoenix, USA, Paper 36.1, 8 pages.

Deshpande et al., "Intelligent Monitoring System Satisfies Customer Needs for Continuous Monitoring and Assurance on VRLA Batteries," Intelec 1999, 7 pages.

Scott, N.D., "A Single Integrated Circuit Approach to Real Capacity Estimation and Life Management of VRLA Batteries," Intelec '01; Edinburgh International Conference Centre (EICC) UK; Oct. 14-18, 2001, 6 pages.

Anbuky, et al, "Distributed VRLA Battery Management Organisation with Provision for Embedded Internet Interface," Intelec 2000; Sep. 10-14, 2000, Phoenix USA, Paper 37.2, 8 pages.

Gabriel et al., "Concepts of Battery Charger Control Using Polarization Voltage," Procedure of American Power Conference, 58$^{th}$ Annual Meeting 1996, 4 pages.

Moore et al., "A Review of Cell Equalization Methods for Lithium Ion and Lithium Polymer Battery Systems," SAE Technical Paper Series, 2001-01-0959, Detroit USA, Mar. 5-8, 2001, 7 pages.

Anbuky et al, "VRLA Battery Intelligent Node," Intelec 2002, Sep. 29-Oct. 3, 2002, Montreal Canada, 7 pages.

Szymborski et al., "Examination of VRLA Cells Sampled from a Battery Energy Storage System (BESS) after 30-Months of Operation," Intelec Telecommunications Energy Conference, 2000, 22$^{nd}$ International, 9 pages.

Combined Search and Examination Report, Application No. GB0514735.0, Aug. 16, 2005.

Combined Search and Examination Report, Application No. GB0514742.6, Aug. 16, 2005.

Combined Search and Examination Report, Application No. GB0514741.8, Aug. 16, 2005.

Combined Search and Examination Report, Application No. GB0514742.6, Aug. 16, 2005.

Troy et al., "Midpoint Conductance Technology Used in Telecommunication Stationary Standby Battery Applications, Part VI, Considerations for Deployment of Midpoint Conductance in Telecommunications Power Applications," INTELEC 1997, 29-4, pp. 695-702.

Yamamoto et al., "Deterioration Estimation Method for 200-Ah Sealed Lead-Acid Batteries," NTT Review, vol. 7, No. 4, Jul. 1995, pp. 65-69.

Yamashita et al., "A New Battery Check System in Telecommunications Power Plants," NTT Review, vol. 9, No. 3, May 1997, pp. 131-135.

* cited by examiner

STRESS MANAGEMENT OF BATTERY RECHARGE, AND METHOD OF STATE OF CHARGE ESTIMATION

CROSS-REFERENCE TO RELATED APPLICATIONS

The present application is a U.S. national phase application of PCT International Application No. PCT/NZ02/00097, having an international filing date of May 14, 2002 and claiming priority to New Zealand Application No. 511701, filed May 14, 2001, the disclosures of which are incorporated herein by reference in their entirety. The above PCT International Application was published in the English language as International Publication No. WO 02/093712.

FIELD OF THE INVENTION

The invention relates to battery charging and more particularly to rapid battery charging and systems for recharging standby or cycling batteries.

BACKGROUND TO THE INVENTION

It is common for modern electrical equipment, particularly computer and telecommunications equipment, to have standby batteries that maintain supply to the equipment during failure of the AC power. After a power failure, when the standby batteries have been in use, it is a high priority to return the batteries to a predetermined level of charge in order to ready the system for the possibility of another interruption in the AC power.

In order to rapidly return standby batteries to a required level of readiness rapid recharge systems are often used. If rapid recharge of batteries is not adequately controlled battery damage can occur which will ultimately result in reduced battery life. Damage to the batteries occurs due to battery overheating (thermal stress) and overcharging (saturation stress). Both of these stresses can contribute to gassing which results in liquid loss and plate damage within the battery.

In order to avoid overheat and overcharge stress modern battery charges employ a variety of charge schemes such as current limit, voltage limit, temperature compensation and charge accumulation/counting. The parameters for these schemes are predetermined, and fixed, to take account of battery type, and ideal/expected operating and ambient conditions.

The problem with such schemes is that they do not take account of changes in battery condition, operating conditions (for example depth of discharge) and ambient conditions that might be expected from a battery installation. For this reason they can promote unnecessary battery stress and/or result in less than optimal recharge times.

SUMMARY OF THE INVENTION

It is an object of the present invention to provide a charge, or recharge, scheme that allows better optimisation of the charging process. It is another object of the present, invention to provide a charge scheme that avoids or ameliorates harmful charging stresses and thus minimises degradation of battery life.

It is a further object of the present invention to at least provide a battery charging scheme which overcomes or ameliorates some of the disadvantages of the prior art schemes or at least provides the public with a useful alternative.

In its broadest aspect the invention provides for scheme(s) for charging one or more cells including: measuring one or more cells and/or ambient variable parameters, or changes in said parameters, either immediately before and/or continuously or periodically during the supply of energy to the cell(s); optionally, manipulating the measured parameter(s), or change in measured parameter(s); and relating the (manipulated) parameter(s) to reference information to obtain first and/or second charge parameter(s) that minimise charge time and/or charge stresses on the cell(s).

According to a first particular aspect the invention provides for a method of supplying energy to one or more cells including:

measuring one or more variable cell and/or ambient parameters;

determining an amount of energy to be supplied to the cell(s); and relating the amount of energy to be supplied to first reference information to obtain a first charge rate parameter for the cell(s);

and, either continuously or periodically during the supply of energy to the cell(s):

measuring one or more variable cell and/or ambient parameters, or changes in said parameters;

during at least a first period of the supply of energy to the cell(s), relating the measured parameter(s) or changes in the measured parameter(s) or a value determined using said parameter(s) to first reference information to obtain an update of the first charge rate parameter; and during at least a second period of the supply of energy to the cell(s), manipulating at least one of the measured parameter(s), or changes in the measured parameter(s), or a value determined using said parameter(s) and comparing said manipulation to reference criteria to determine the cell(s) response to the energy supplied and from said response choosing either a second charge rate parameter, or an update of the first charge rate parameter for the cell(s).

Preferably the amount of energy to be returned to the cell(s) is determined through a measure of the state of charge of the cell(s).

Preferably the one or more variable cell and/or ambient parameters are one or more of voltage, current, cell(s) temperature, and ambient temperature.

Preferably the first charge rate parameter is charge current and the second charge rate parameter is charge voltage.

Preferably two measured variable parameters are cell voltage and temperature, wherein voltage and the first charge rate parameter are related to second reference information to obtain an update of the amount of energy to be supplied to the cell(s), the updated amount of energy and cell(s) temperature being related to first reference information to obtain an update for the first charge rate parameter.

Preferably the second reference information is a characterisation or model relating cell voltage, charge rate and temperature to state of charge of the cell.

Preferably first reference information is a characterisation or model relating allowed cell temperature rise and required state of charge rise to the first charge rate parameter.

Preferably one measured variable parameter is cell(s) voltage, the voltage being manipulated to obtain two or more values, said values being related to reference criteria to determine the cell(s) response to the energy being supplied.

Preferably the manipulation includes finding the first, second, third, and optionally fourth, derivatives of cell voltage.

According to a second particular aspect the invention provides for a method of obtaining information about the amount of energy to be supplied to one or more cells including:

acquiring a plurality of data relating one or more variable cell and/or ambient parameter(s), or change in said parameter(s), to state of charge of the cell(s);

characterising the data to obtain second reference information;

measuring, either continuously or periodically, the variable parameter(s), or change in variable parameter(s), during at least a first period of charging of the cell(s); and relating the measured variable parameter(s), or change in the measured variable parameter(s), to the second reference information to obtain an absolute or relative estimation of the state of charge of the battery.

The invention envisages that the second reference information may be a characterisation, function, model or similar that relates the one or more variable cell and/or ambient parameters, or change in said parameters, to state of charge of the cell(s), and is established through previous testing of the cell(s). The method may involve the steps of measuring a plurality of input data (voltage, current, cell temperature and ambient temperature) and a respective output data (state of charge) for one or more instances of cell(s) charging, and characterising said input and output data to obtain one or more functions or models representing the relationship between the input data and the output data, wherein the function or models allow the state of charge of the cell(s) to be obtained from variable cell and/or ambient parameters during subsequent charges.

According to a third particular aspect the invention provides for a method of selecting a charge parameter for one or more cell(s) including:

acquiring data relating one or more variable cell parameters), or change in said parameter(s);

characterising the data to obtain first reference information;

selecting an allowable temperature rise for the cell(s);

determining an amount of energy to be supplied to the cell(s); and relating the temperature rise and energy to be supplied to the first reference information to obtain an absolute or relative estimation of the value of the charge parameter.

The method may further include, either continually or periodically during charging of the cell(s), optionally revising the allowable temperature rise for the cell(s); determining a remaining amount of energy to supply to the cell(s); and relating the temperature rise and remaining energy to be supplied to the reference information to obtain an updated to the absolute or relative estimation of the value of the charge parameter.

The invention envisages that the first reference information may be a characterisation, function, model or similar that relates the one or more variable cell parameters, or change in said parameters, to charge rate of the cell(s), and is established through testing of the cell(s). The method may involve the steps of measuring data (cell temperature, state of charge rise and charge current) for one or more instances of battery charging, and characterising said data to obtain one or more functions or models representing the relationship between the data, wherein the function or model allows the charge rate of the cell(s) to be obtained from variable cell parameters during subsequent charges.

According to a fourth particular aspect the invention provides for a method of detecting overcharge in one or more cells including:

measuring a variable cell parameter during at least part of a charge of one or more cells;

manipulating the parameter to obtain three or more of its derivatives; and comparing said derivatives to reference criteria and selecting a result based on said comparison.

The method may further include choosing a charge rate parameter for the cell(s) based on the result of the comparison.

Preferably the variable cell parameter is voltage and the derivatives are the first, second and third. The reference criteria are one or more states for each derivative, the states being positive for the first and third derivatives, and positive and above a threshold value for the second derivative. Preferably, although not exclusively, the fourth derivative may be obtained, the state for the fourth derivative being positive.

The method provides for detection of a change in cell voltage that indicates when the cell is no longer accepting substantially all of the supplied charge energy in a desired charge reaction and thus some energy is being consumed in unwanted overcharge reaction(s). The method discriminates between start of charge transients and overcharge reaction(s).

In a further aspect the invention also provides for a charge apparatus adapted to charge one or more cells according to one of the above defined aspects.

In yet a further aspect the invention provides for a computer readable medium containing instructions to enable a computer or micro-processor to perform steps according to one of the above mentioned aspects.

Further aspects of the invention will come apparent from the following description, which is given by way of example only.

BRIEF DESCRIPTION OF THE DRAWINGS

The invention will now be described with reference to the following drawings in which.

DESCRIPTION OF THE PREFERRED EXAMPLE

Figure 1:
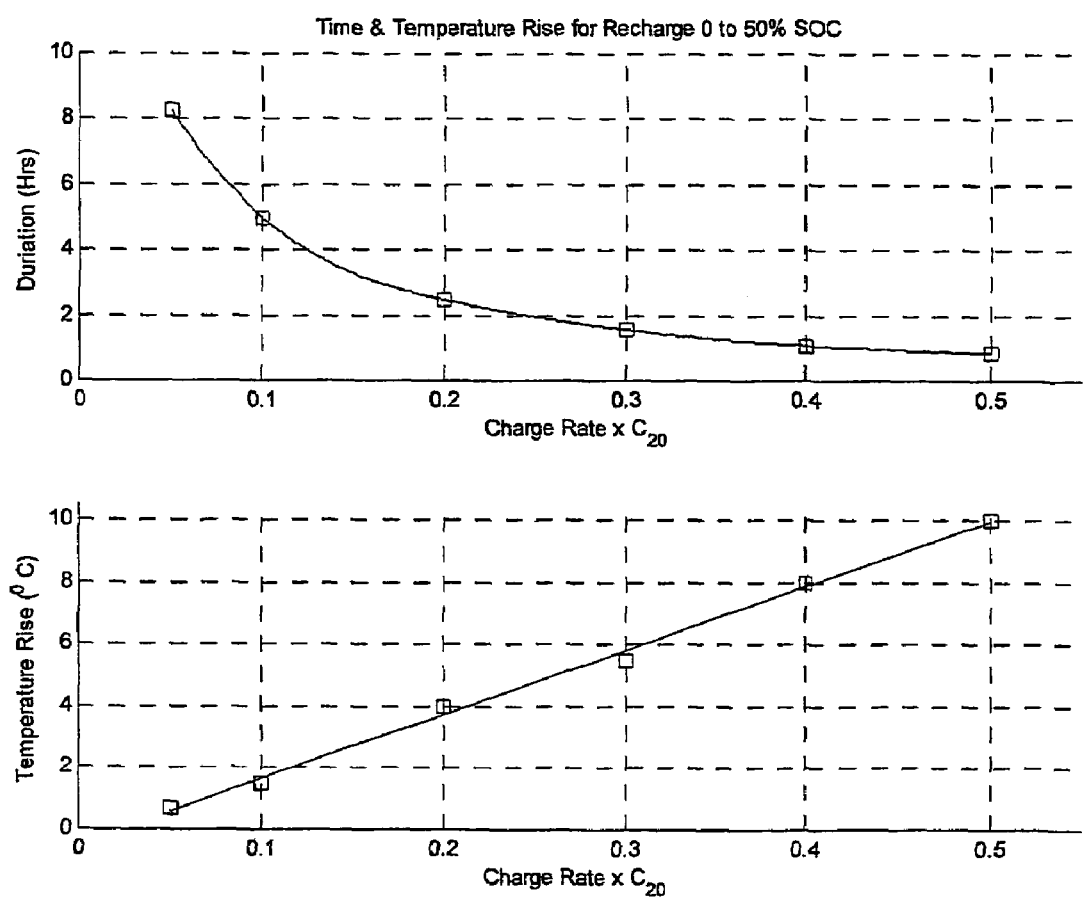
FIG. 1: illustrates the time taken and a temperature change of a typical cell for a 50% increase in state of charge using a prior art charge scheme.

The invention will now be described with reference to the recharge of one or more cells after a partial or full discharge. It is to be understood however that aspects of the current invention may be applied to other charge activities such as float charge, boost charge and intermittent charge. While the current invention is particularly suited to rapid charge/recharge of batteries, i.e. where batteries must be returned to a high level of charge in a short time period, it is also particularly useful in any charging situation where battery damage is to be avoided.

In the following discussion the terms charge and recharge are inter-changeable and refer to the supply of energy to a cell or battery that has less than 100% state of charge.

Two stress mechanisms have the potential to reduce battery life if battery charging is not adequately controlled. These are thermal stress and overcharge stress. The invention provides two separate but overlapping control schemes that allow these stresses to be maintained within acceptable levels.

The first scheme controls the charge current to prevent excessive heating (thermal stress) of the battery. This requires a battery state of charge estimate to allow the amount of charge, or energy, to be supplied to the battery to be predicted. When this is combined with knowledge of the charge heating characteristics an appropriate charge current can be selected to maintain battery heating within an accepted (user defined) window. The depth of previous discharge and the allowable temperature rise of the battery influence the charge rate. Thermal stress determines the rate at which the bulk of the charge can be returned to the battery.

The second scheme senses the battery's response to the supplied charge current. If it is determined that the battery is storing the energy supplied in the desired charge reaction the charge current is maintained. However, if it is determined that some of the supplied energy is being consumed in unwanted overcharge reactions, the charge rate is reduced. A method of detecting overcharge reaction produces an adaptable charge voltage. This will produce the maximum charge voltage for the condition and state of charge of the battery. The second scheme attempts to reduce the overall time required to return the battery to 100% state of charge. No voltage limit is set during the charge process.

In order to fully understand the current invention the discussion is broken into two limbs: thermal stress control, and overcharge stress control.

It is envisaged that a preferred embodiment of the invention provides a system that incorporates both of these aspects. It will, however, be apparent to the skilled addressee that either aspect incorporated into a charge management strategy would provide significant benefits.

A Stress Controlled Recharge System combining both aspects is discussed later.

Thermal Stress Management

It will be apparent to the skilled addressee that inefficiencies in conversion of electrical energy and internal resistance losses ($I^2R$ losses) result in heating of a battery during the charging process.

During higher charge rates the $I^2R$ losses are the dominant form of battery heating. The heat produced is proportional to the square of the current, however the charge time is reduced by approximately the inverse of the charge rate. The net effect is that the total heat energy supplied to the battery is directly proportional to the rate of charge. This is illustrated in FIG. 1.

FIG. 1 illustrates the time taken and a temperature change of a 6RG180 cell for a 50% increase in state of charge using a prior art charge scheme. The charge rate is given as a proportion of the $C_{20}$ value of the cell. In the case of the 6RG180 cell the $C_{20}$ value is 180AH.

The current invention envisages that for an optimum minimum temperature rise a small amount of charge may be returned to the battery at a higher rate than a large amount of charge. This is because of the accumulative effect of the longer duration required to return a greater level of charge to the battery. Thus by determining the amount of charge to be returned to the battery and with knowledge of the heating characteristics of the battery the current invention provides that a suitable charge current may be selected that will make full use of the allowed temperature rise over the full duration of the charge.

In order to optimise the charge/recharge time the charge still to be returned to the battery and battery temperature must be measured in real-time so that the charge rate can be monitored and if necessary dynamically varied throughout the charge/recharge process.

The invention provides a method of estimating state of charge in real-time directly from easily measurable variable cell and/or ambient parameters such as cell voltage, current and temperature. However, this method is not crucial to the invention and could be replaced by any other means of state of charge estimation. With knowledge of the actual state of charge of the battery and the desired state of charge of the battery the amount of charge to be returned can be established The state of charge estimation method provided by the invention involves testing the battery to determine the relationship between the measurable variable parameters and state of charge. This characterisation results in reference information, which for current purposes is second reference information. In the preferred embodiment this second reference information is a model that can be used to predict the state of charge in real-time without interrupting the charge process. The model relates cell voltage, charge rate (current) and cell temperature to state of charge of the cell.

Figure 2:
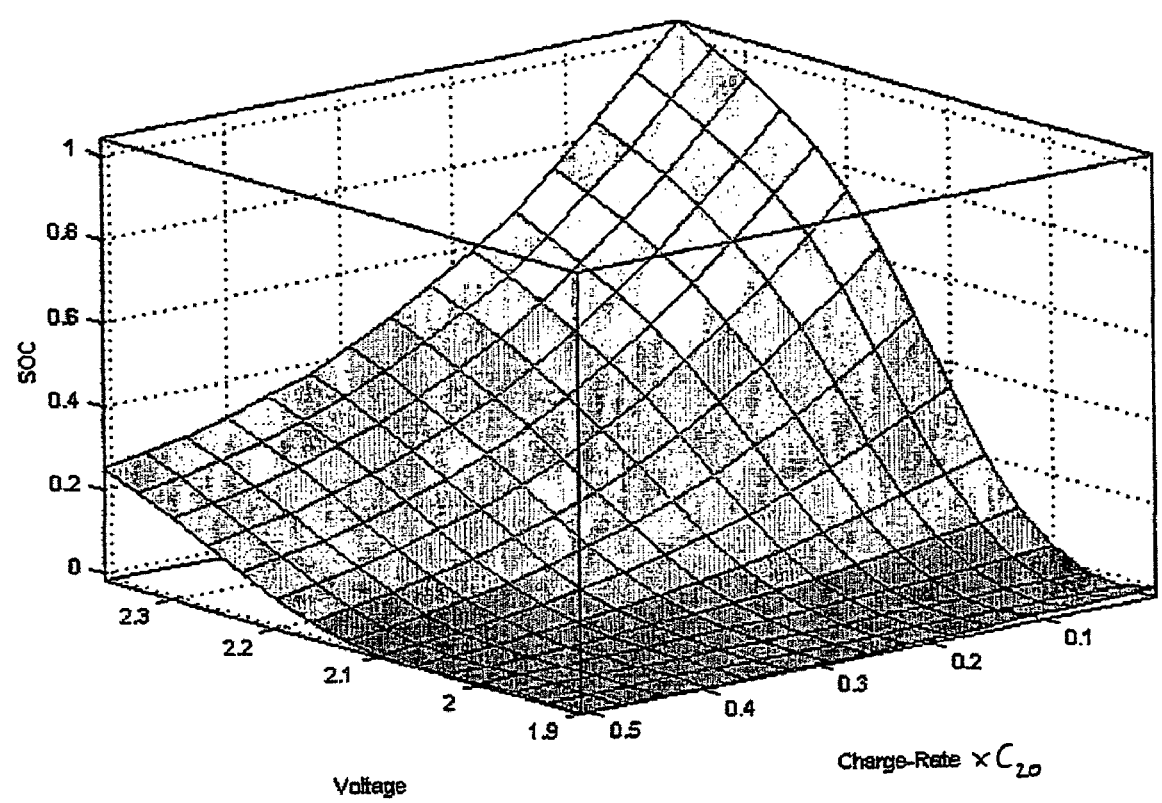
FIG. 2: illustrates the results from a fuzzy model adapted to estimate the state of charge of a cell at a first temperature.
Figure 3:
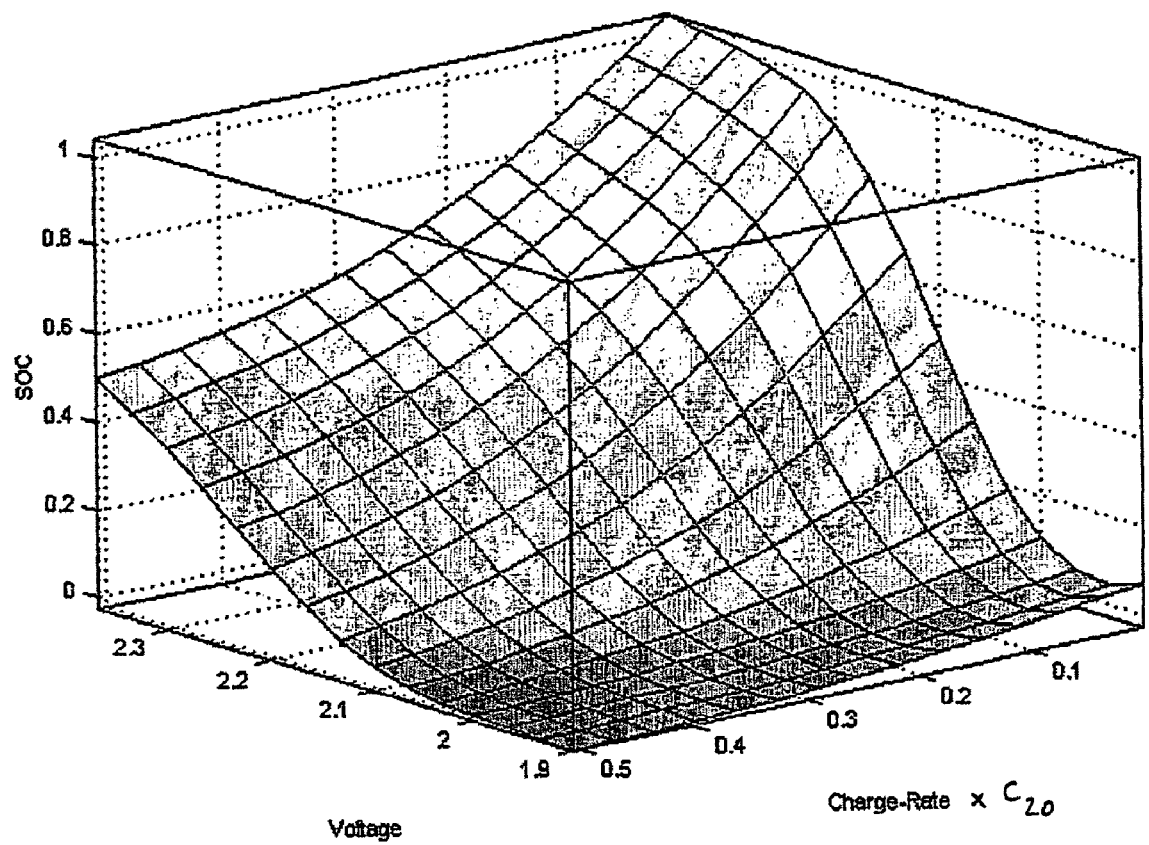
FIG. 3: illustrates the results from a fuzzy model adapted to estimate the state of charge of a cell at a second temperature.

Because this relationship has multiple input data (current, voltage and temperature) and a single output relationship (state of charge) an SOC Fuzzy Logic model is used to map the input data to the output data. FIG. 2 shows the results of an SOC fuzzy model for temperature of 15 degrees centigrade, and FIG. 3 shows the results of the SOC fuzzy model for 30 degrees centigrade. That is, the models of FIGS. 2 and 3 were calculated by performing a test on a battery in a heating chamber held at a temperature of 15 and 30 degrees centigrade respectively. The cell voltage produced by a particular charge current and temperature, can be used to determine the real-time state of charge of the battery.

Fuzzy logic provides an environment that can greatly simplify problems where multiple inputs variables are mapped to a single output solution. This mapping can produce a smooth continuous output when input/output function/s are non-linear or piecewise. There is a large amount of literature on the use of Fuzzy Logic and the development of a suitable model should be well within the capabilities of the skilled addressee. While fuzzy logic has been utilised in this example to create the mapping of input variables to an output solution, a conventional hard computed solution may also be used.

Training of the fuzzy model is achieved using empirical data. The data is obtained through testing of the battery. This involves charging the battery with a constant current until a desired voltage is reached, and then discharging the battery and recording the charge released. The charge released during the discharge is compared to the rated capacity of the battery in order to determine the approximate state of charge of the battery. By varying cell voltage, charge current and temperature during successive charge/discharge tests a large set of input/output relationship data is produced, which is used to train the fuzzy model.

While high accuracy of the State of Charge model is desired this is not essential to the invention. For acceptable thermal management only an indication of the state of charge is required. It is not necessary to know the battery is, say, exactly 26.231% charged. If it is estimated that the battery is about one quarter full it is reasonable to expect the charge duration to be lengthy and cumulative heating effects will be significant.

However, in order to achieve an acceptable level of model accuracy testing should be performed on a similar battery to that to be charged.

In conventional measuring terms, the fuzzy model might typically have high resolution with limited accuracy. The model is designed to cover the charge phase of battery life where the bulk of the charge is returned to the battery (the first period of the charge), this is before the overcharge or charge saturation reactions occur. It is not necessary to provide an indication of the state of charge of the battery when the battery is at or near float charge and the overcharge reactions are present (the second period of the charge). The operating domain of the model is over all of the charge/recharge region except overcharging. During overcharging (the second period of the charge) the overcharge scheme discussed later is dominant.

It is worth noting that according to the above method the fuzzy model is developed under constant current conditions, and when transients such as a step change in the charge current occur accuracy of the model is slightly degraded. This improves as the battery settles to the new conditions (typically 10's of seconds to minutes).

Once an estimate of a battery's state of charge has been obtained the amount of energy to be returned to the battery is determined by comparison of state of charge with a desired state of charge. The amount of energy to be returned to the battery is the required state of charge rise.

Knowledge of the charge heating characteristic of the battery is required before successful thermal management can be implemented. As different battery and installation combinations will have different thermal characteristics, the system should be calibrated for the installation site. Calibration is achieved by performing a constant current charge/recharge and monitoring the temperature and State of Charge Rise during the recharge. With this data reference information can be produced. For current purposes this is first reference information. The first reference information is a Charge Rate Selection model as shown in FIG. 4.

Figure 4:
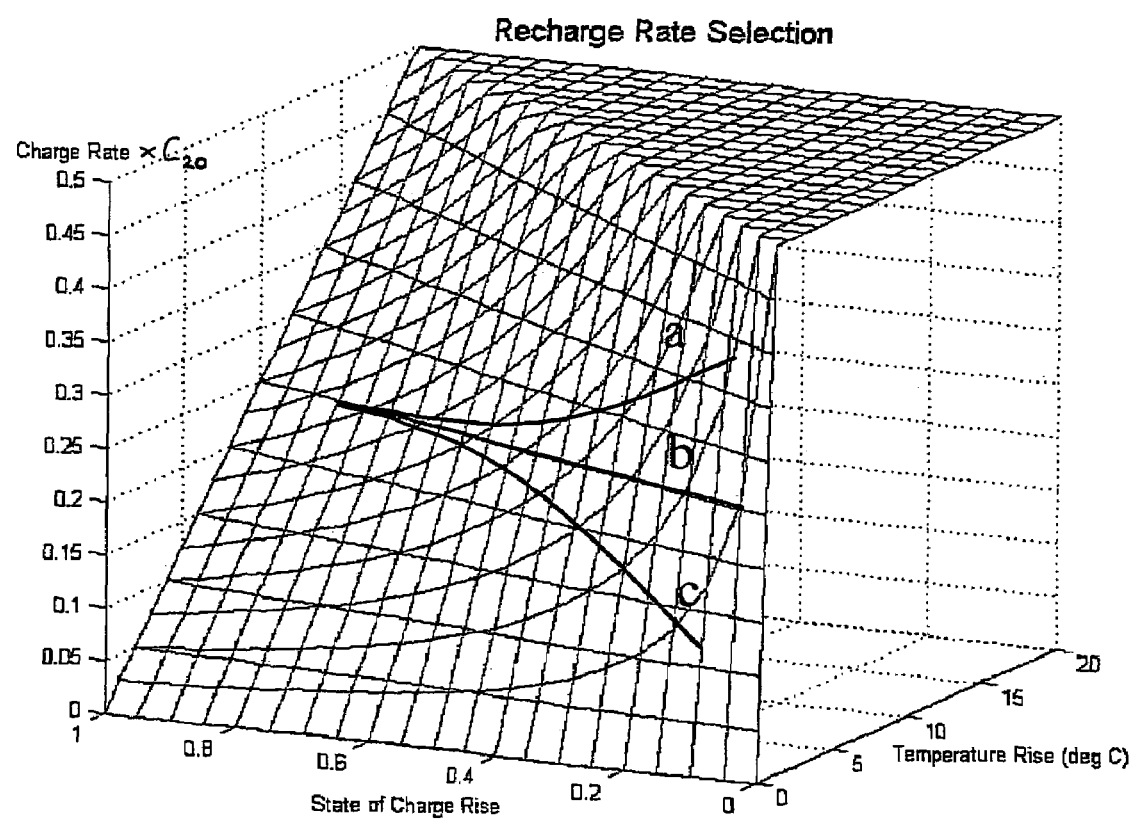
FIG. 4: illustrates a thermal model for determining the recharge rate of a cell.

The relationship between Charge Rate, Temperature Rise and State of Charge Rise (SOCrise), as shown in FIG. 4, can be expressed as:

$$ChargeRate = \frac{TemperatureRise}{\alpha \times SOCrise + \beta}$$

Where $\alpha$ and $\beta$ are the scaling constants determined by the calibration process.

It should be within the capabilities of the skilled addressee to determine these constants. Constant '$\beta$' gives a finite slope to the zero State of Charge Rise region of the Recharge Rate Selection surface (FIG. 4). This adds stability to the system and allows for some thermal overshoot when a high rate charge is terminated. A value of $\beta=4$ achieves desirable results.

From the calibration charge $$\alpha = \frac{MeasuredTemperatureRise}{ChargeRateUsed \times SOCriseMeasured + \beta}$$

With a fixed heat source ($i^2r$ losses) during recharge the temperature difference between the battery and the surroundings will increase as the temperature of the battery increases. This causes more heat to be dissipated from the battery to the atmosphere. Eventually the heat dissipated to the atmosphere will increase to the point where equilibrium is formed between the heat energy supplied to the battery and the heat dissipated to the atmosphere. At this point no further heating of the battery will occur. While this effect is naturally expected, the relatively small (from a few degrees to tens of degrees centigrade) thermal rise of the battery during a charge does not allow rapid heat dissipation to the atmosphere. The high ratio of specific heat capacity of the battery compared to the small amount of heat dissipated allows the dissipated heat to be neglected. The temperature rise of the battery can therefore be assumed to be linear with time.

Once the Charge Rate Selection model is appropriately scaled, charge temperature limits need to be selected. The thermal control developed allows direct control over the temperature rise during the recharge. The limits should be set according to period between successive recharges, desired/maximum allowed recharge time and impact on expected battery life. There are many possible schemes for setting the temperature limit, these may be based on an absolute limit, a fixed rise above ambient temperature, relative to the battery temperature at the start of the recharge or a combination of these.

After appropriate thermal limits have been selected, the allowable temperature rise of the battery can be calculated as the difference between the battery temperature and the defined limit. With this information and knowledge of the required state of charge rise a first charge rate parameter, charge current, can be selected using the Charge Rate Selection model.

FIG. 4 shows the model and three possible trajectories for a battery charge starting from 15% state of charge. Trajectory 'b' is the desired path, this requires an appropriate state of charge estimate throughout the charge and a good thermal model of the battery and surroundings. If during the recharge the battery temperature rises faster than expected, or if the state-of-charge estimates are low, trajectory 'c' will result. When battery heating is less than expected, or if the charge state estimate is high, trajectory 'a' may result. Ideally a flat constant-current should persist throughout the recharge period.

By continuously or periodically determining state of charge and battery temperature during the charge/recharge the charge current can be monitored and if necessary updated to ensure the battery can be charged to the required state of charge within defined temperature limits.

It can be seen that for a given temperature rise, when the battery is charged from a lower state of charge a lower charge current would be selected than then recharged from a higher state of charge.

Figure 5:
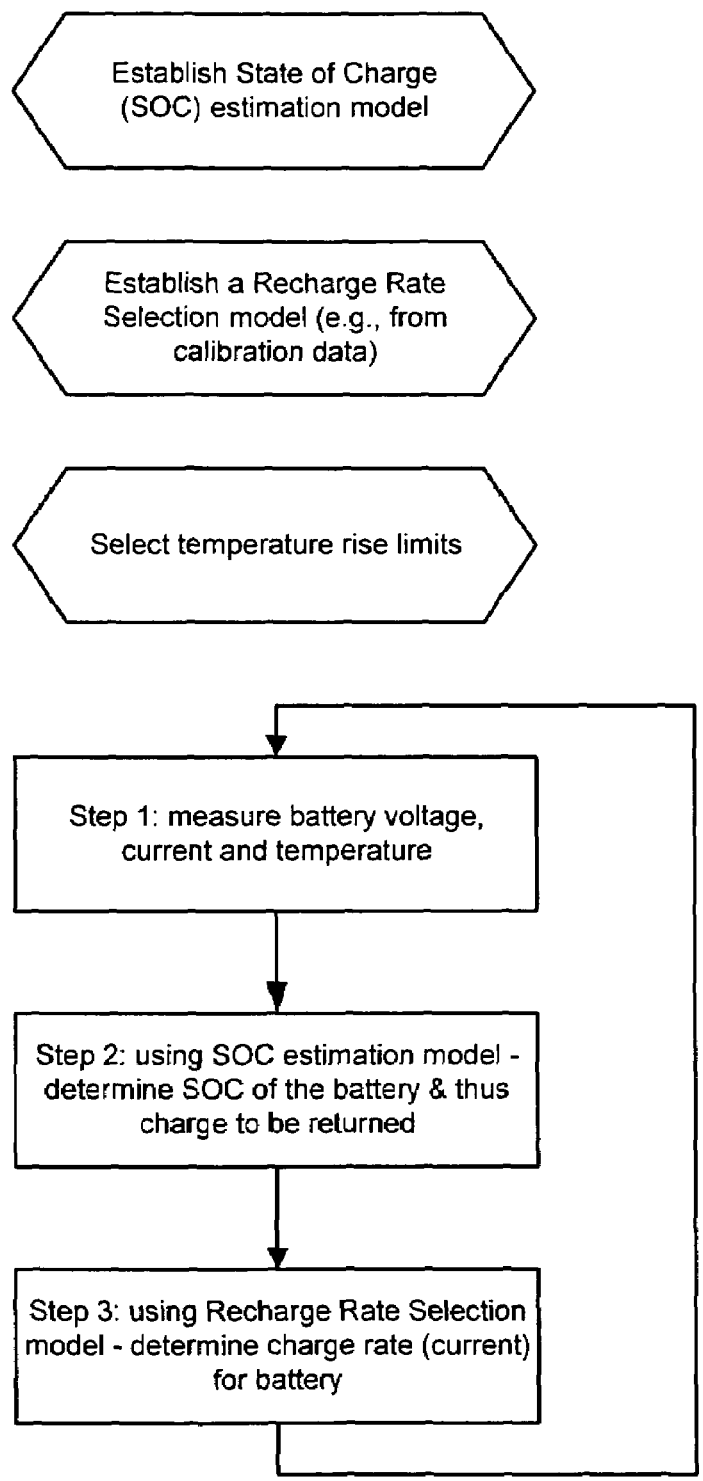
FIG. 5: illustrates, in a flow diagram, steps for a first aspect of the invention.

FIG. 5 sets out, in flow chart form, the steps for thermal stress management according to a preferred embodiment of the invention. Referring to FIG. 5: firstly, a State of Charge estimation model (second reference information) and Recharge Rate Selection model (first reference information) are established. The battery manufacturers, as part of their battery behavioural analysis, could generate these models. The temperature rise limits of the battery selected could be set during the installation/commissioning stage. During charge/recharge of the battery the following steps are undertaken. Step 1: The variable cell and ambient parameters of battery voltage, temperature and (charge) current are measured.

Step 2: by comparing these measured variables to the State of Charge estimation model the state of charge can be established and the amount of energy to be returned to the battery determined. Step 3: by comparing the amount of energy to be returned (state of charge rise) and: allowed temperature rise (temperature rise limits) to the Recharge Rate Selection model the desired charge current (first charge rate parameter) is determined. Steps 1 to 3 are repeated either continuously or periodically until the desired state of charge is reached.

Figure 6:
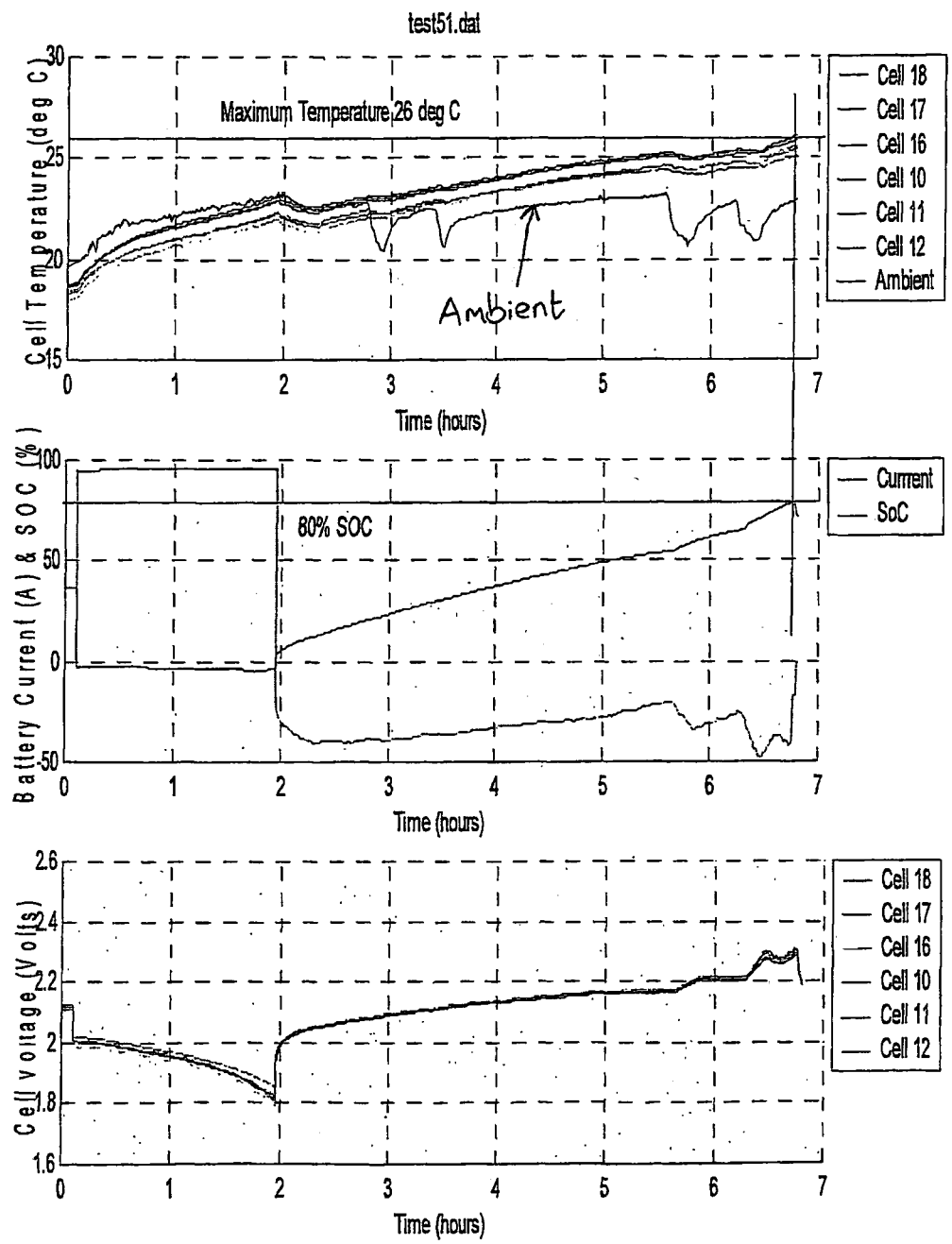
FIG. 6: illustrates cell parameters during a thermally managed recharge of the cell.

The plots in FIG. 6 show cell variables from a recharge that has been thermally managed. In this example the maximum cell temperature was set at 26 degrees centigrade and the state of charge target was set at 80%. The recharge started at time equals 2 hours. It can be seen that a rapid change in ambient temperature influenced the rate of heating of the batteries and the charge current automatically adjusted to compensate. It can also be seen that when the cyclic operation of the air-conditioner ceases temporarily the charge current reduces to prevent the battery from exceeding the temperature limit. As the air conditioner returned to normal operation the battery dissipated more heat and the charge current increased. This ensured the state of charge and temperature aims are achieved. It can be seen over the entire charge period that the current would remain at a reasonably constant level if the initial determinations are accurate and the environment remains constant.

Overcharge Stress Management

When a battery is charged from a constant current source a near constant voltage rise is produced while the battery is absorbing the supplied energy. As the battery approaches a full state of charge the rate at which the battery can absorb (i.e. store) energy is reduced. If more energy is supplied to the battery than can be absorbed overcharge reactions will result. This is illustrated by the plots in FIG. 7. The plots show a current-limited recharge where a voltage limit has not been set. It can be seen that throughout the bulk of the charge the cell voltage increases in a near linear fashion. As the cell approaches the fully charged status a rapid rise in cell voltage is produced. The rapid voltage rise results when the supplied energy is not wholly consumed within the desired recharge reaction. A portion of the supplied recharge energy is consumed in the overcharge reactions involving oxygen evolution and reduction. This excess energy absorbed in the overcharge reaction is eventually dissipated as heat or if extreme overcharge is allowed may result in gas loss from the cell. As both battery heating and gas loss are undesirable overcharge should be minimised.

It is normally desirable to recharge a battery in the shortest possible time. Many prior art fast charge algorithms decrease the charge time by forcing a raise in battery voltage above the normal float voltage. This higher voltage can significantly reduce the total charge time. It has been claimed that increasing the voltage to which the cell is charged from 2.27 VPC to 2.4 VPC can reduce the total charge time by a factor of two. However, this can cause unwanted stress to the battery or may not produce the fastest possible charge for the conditions.

The invention provides a charge saturation (overcharge) detection scheme that does not use a pre-set voltage limit. The response of the batteries to the supplied charge current is continuously monitored for charge saturation. When this is detected the rate of charge is reduced.

Charging with saturation detection minimises battery stress and produces the quickest possible recharge for the battery condition. A sufficiently warm battery, capable of accepting high rates of charge, will result in a charge with a relatively high end-voltage. However, if the battery is cold charge saturation will occur at lower states of charge. When this is detected, the charge rate is reduced to a level that can be accepted by the battery, therefore minimising battery stress.

Figure 7:
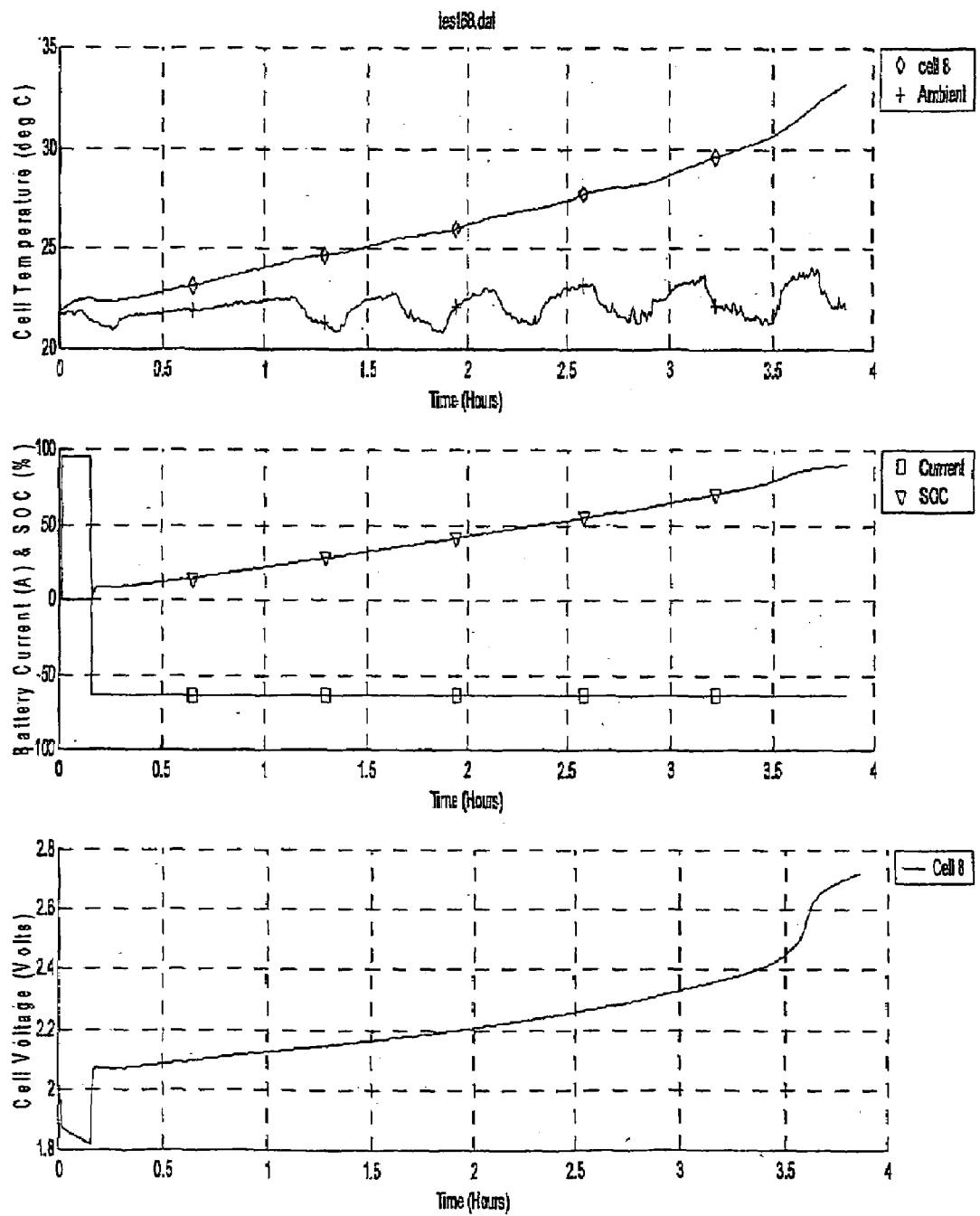
FIG. 7: illustrates cell parameters showing overcharge stress during a prior art current-limited recharge of the cell.
Figure 8:
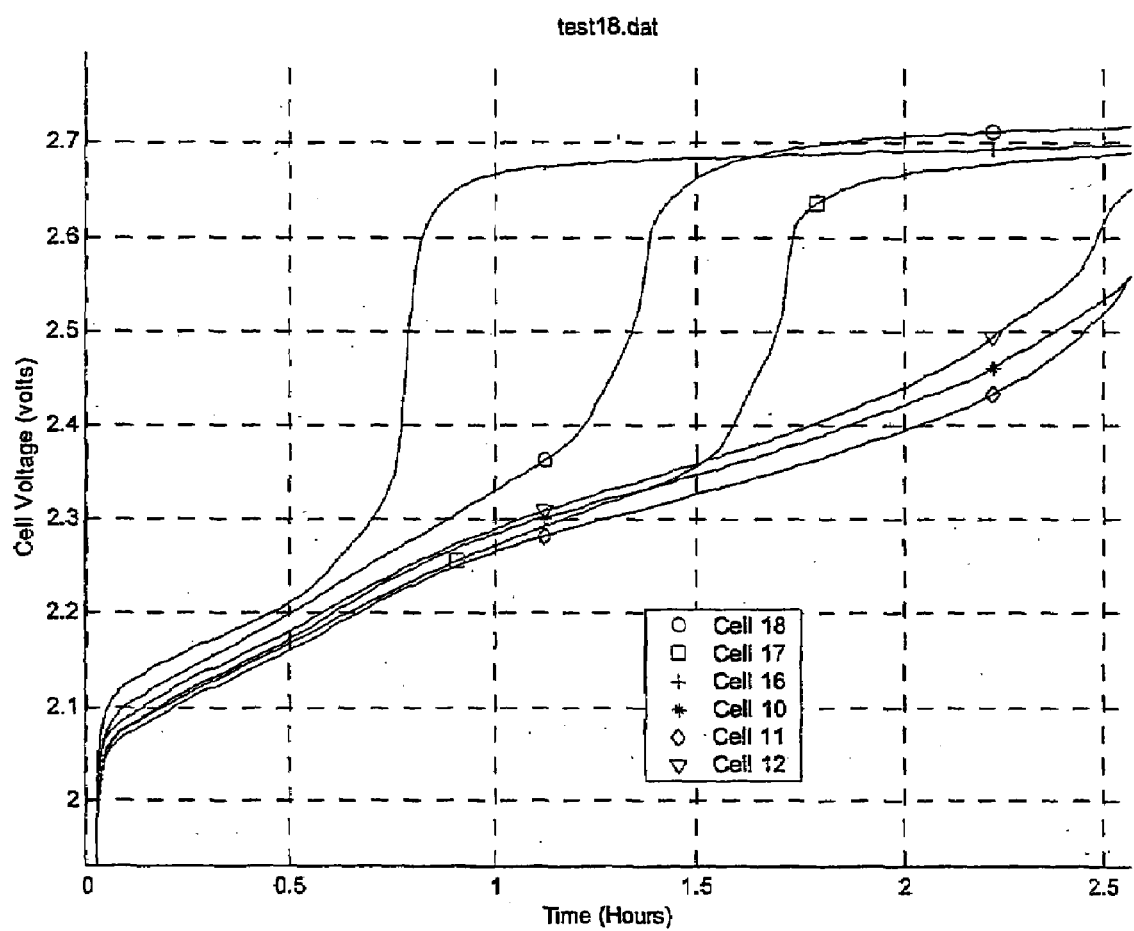
FIG. 8: illustrates charge saturation for a group of 6 cells during a prior art recharge.

Both FIG. 7 and FIG. 8 show charge saturation occurring. While post analysis allows the onset of charge saturation to be easily identified, real-time analysis is more difficult, especially if the early stages of saturation are to be detected. Saturation is principally detected as an increase in the rate of voltage rise (voltage acceleration) while charging under constant current (current limit).

Figure 9:
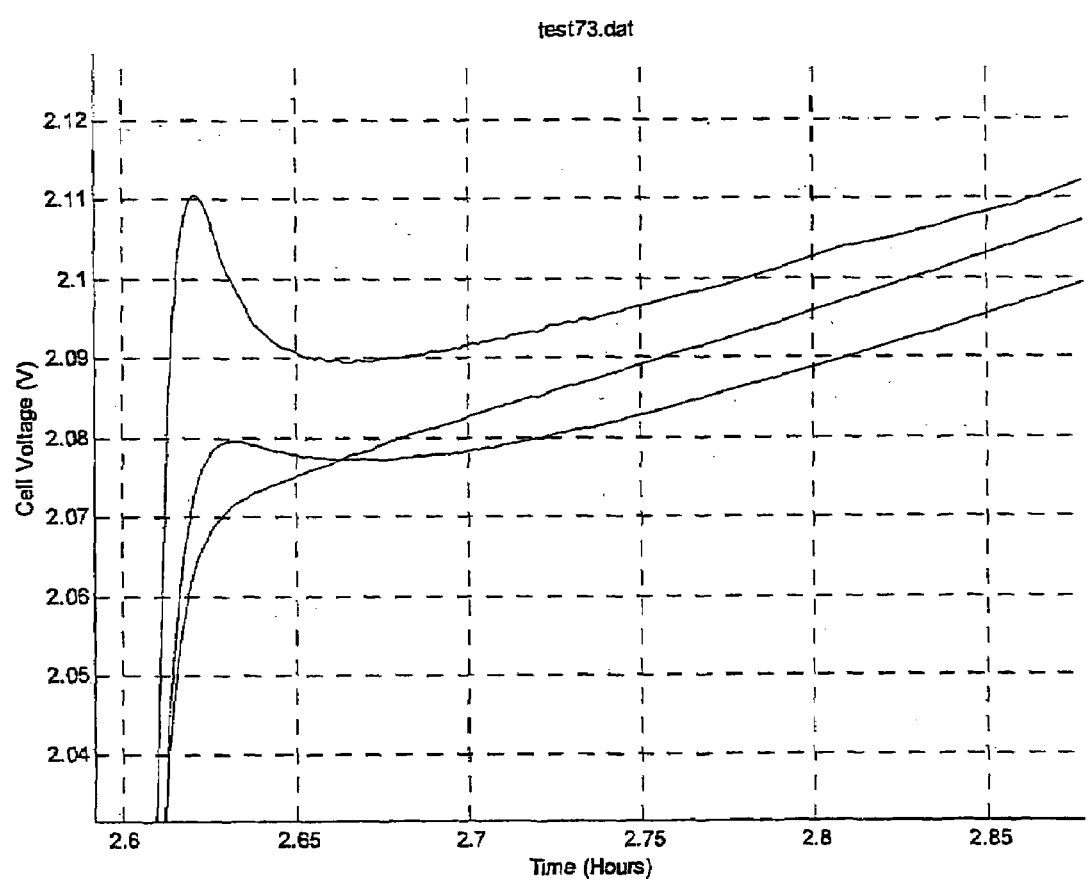
FIG. 9: illustrates a typical transient in cell voltage during the initial part of a cell recharge.

A voltage maximum (spannungsberg) may occur at the start of recharge when a completely discharged cell is charged with constant current. This appears as almost a mirror of the Coup de fouet (spannungssack) seen when a fully charged lead acid battery is discharged. The voltage maximum transient at the start or recharge is shown in FIG. 9. The degree of overshoot is dependent on the particular cell and the depth of discharge preceding the recharge.

Although not immediately obvious, as this initial transient settles to a constant rate of voltage rise there is voltage acceleration. As voltage acceleration is the identifier for charge saturation, some mechanism is required to differentiate between saturation and this initial transient. Simple transient masking by voltage level and/or time thresholds are not feasible as the voltage at which these transients occur is dependent on the state of charge and the temperature of the battery. Also, the duration of these initial voltage transients is dependent on the rate of charge. If a high-rate recharge is initiated from a high state of charge, charge-saturation may be produced almost immediately hence transient masking through timeouts may not prevent damaging charge saturation from occurring.

To discriminate between charge saturation and start of charge transients, the voltage parameter is manipulated to provide voltage slope (dV/dt), acceleration ($d^2V/dt^2$) and slope of the voltage-acceleration ($d^3V/dt^3$). For charge saturation detection the following reference criteria are used: all three manipulated parameters must be positive and the voltage acceleration must exceed a set threshold level. The rate of change of the voltage acceleration ($d^4V/dt^4$) must also be positive to ensure true detection of charge saturation. To produce accurate results care must be taken when selecting the resolution and sample frequency for sampled date. With real-time sampled data a time lag or skew is produced as the raw data is filtered and assessed. An adaptive filtering system can be used to minimise the filtering delay. Discussion on an adaptive filtering system is available in: P. M Hunter, *Advanced Battery Management and Control*, Pg 94-96, M. E. Thesis, University of Canterbury 1999.

Figure 10:
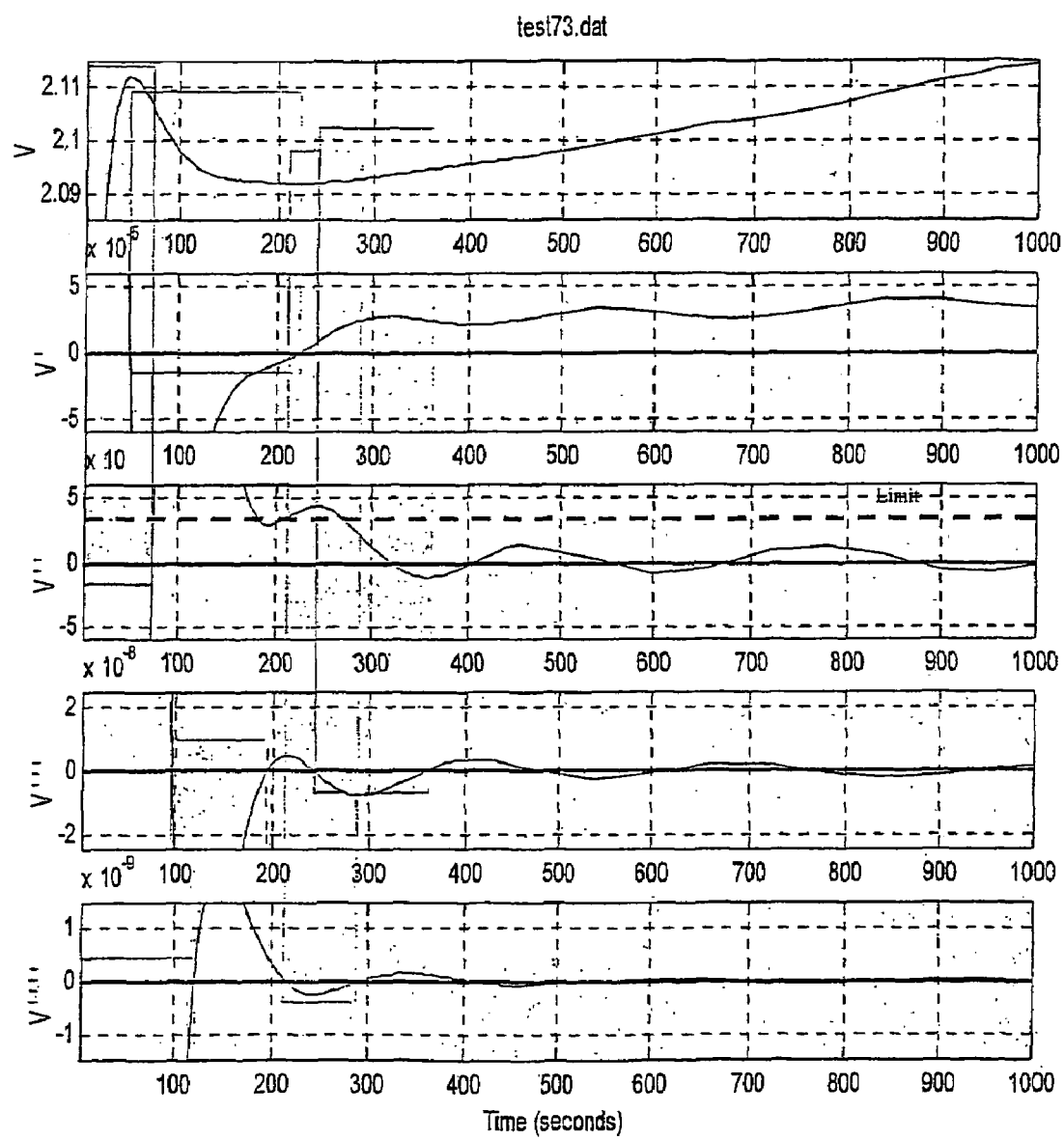
FIG. 10: illustrates a scheme of masking cell parameter transients during cell recharge.
Figure 11:
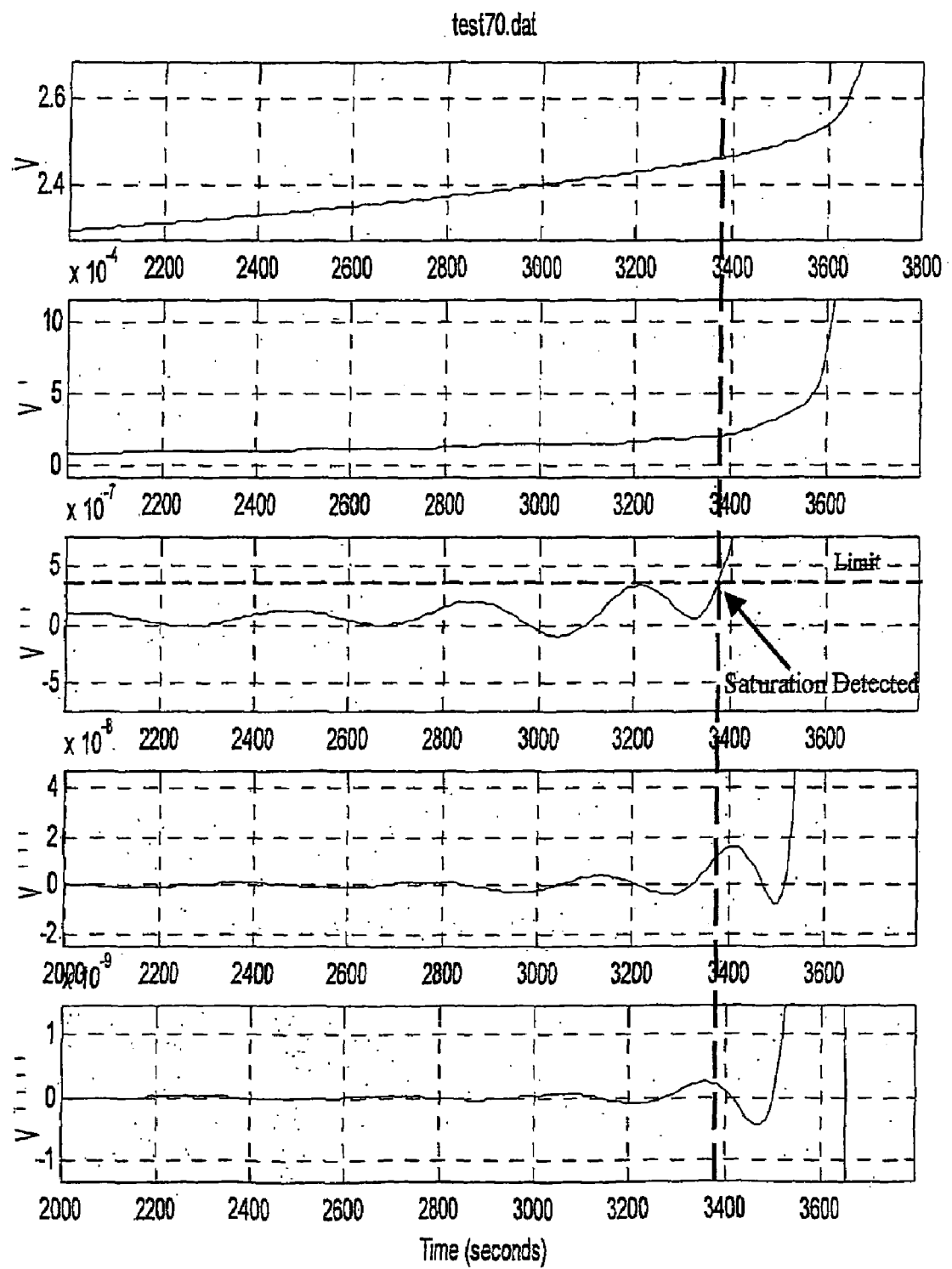
FIG. 11: illustrates overcharge detection during cell charging.

FIG. 10 shows the start of charge transient being successfully masked through the multiple differentials (derivatives) V', V'', V''', V'''' of the cell voltage. FIG. 11 shows saturation being detected by all the differentials V', V'', V''', V'''' being positive and the voltage acceleration ($2^{nd}$ differential) being greater than the threshold. On detecting charge saturation the charge current should be reduced to a level that can be accepted by the battery. The amount of charge rate reduction will depend on the degree of saturation experienced and the delay involved in detection. The oscillations seen in the voltage derivatives result from approximating the voltage data by a high order polynomial to simplify the differentiation.

Figure 12:
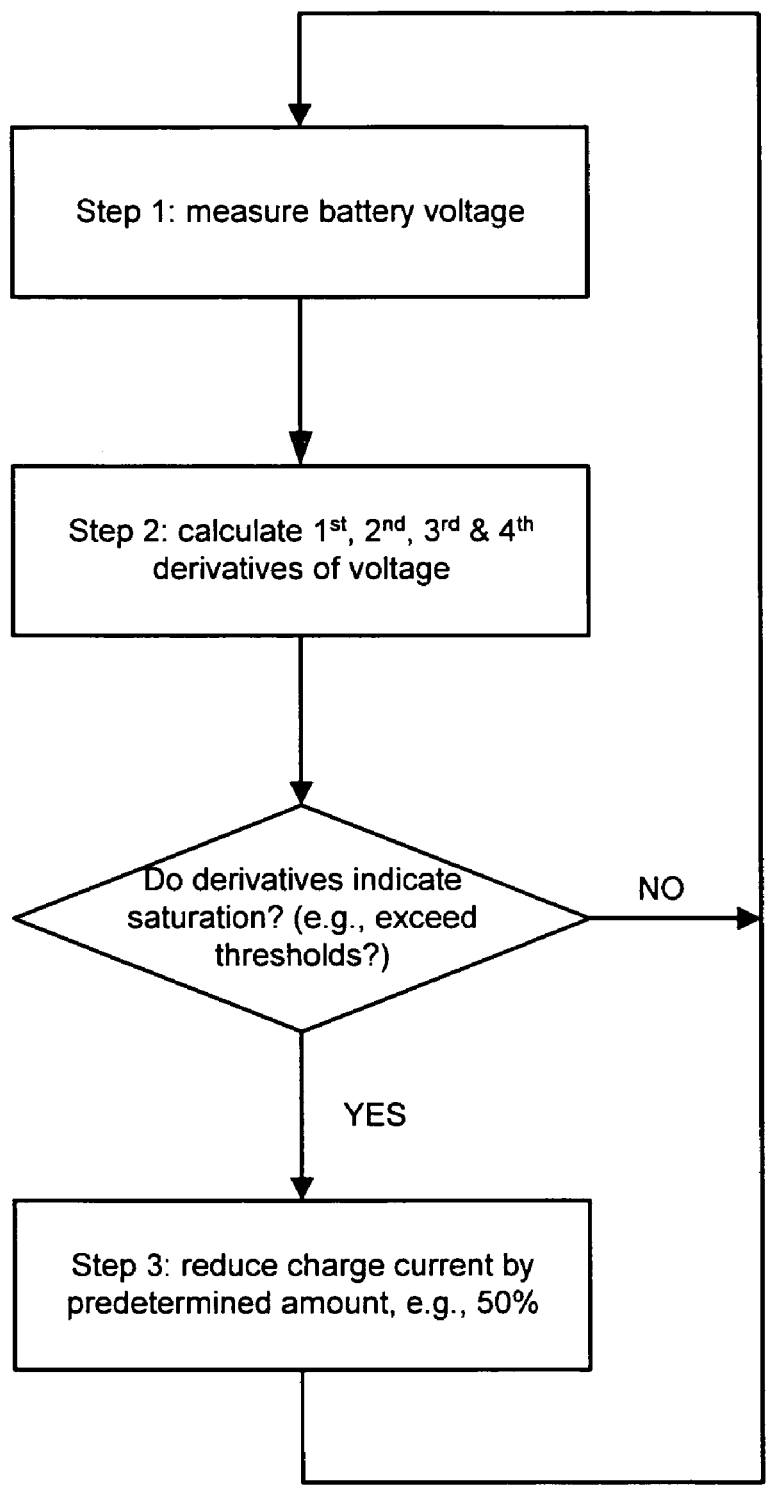
FIG. 12: illustrates, in a flow diagram, steps for a second aspect of the invention.

FIG. 12 sets out, in flow chart form, the steps for overcharge stress management according to a preferred embodiment of the invention. Step 1: the variable parameter, battery voltage, is measured. This can be a unique measurement or one obtained during Step 1 of the thermal stress management aspect. Step 2: the variable parameter is manipulated to obtain first to fourth derivatives and these are compared to reference criteria (e.g., threshold values) to determine if overcharge saturation is occurring. If overcharge is occurring Step 3 requires that the charge current is reduced by a pre-set value, in this embodiment by 50%. If overcharge saturation is not occurring the charge current need not be reduced. Steps 1 to 3 are repeated either continuously or periodically until the desired state of charge is reached.

Stress Controlled Recharge

Figure 13:
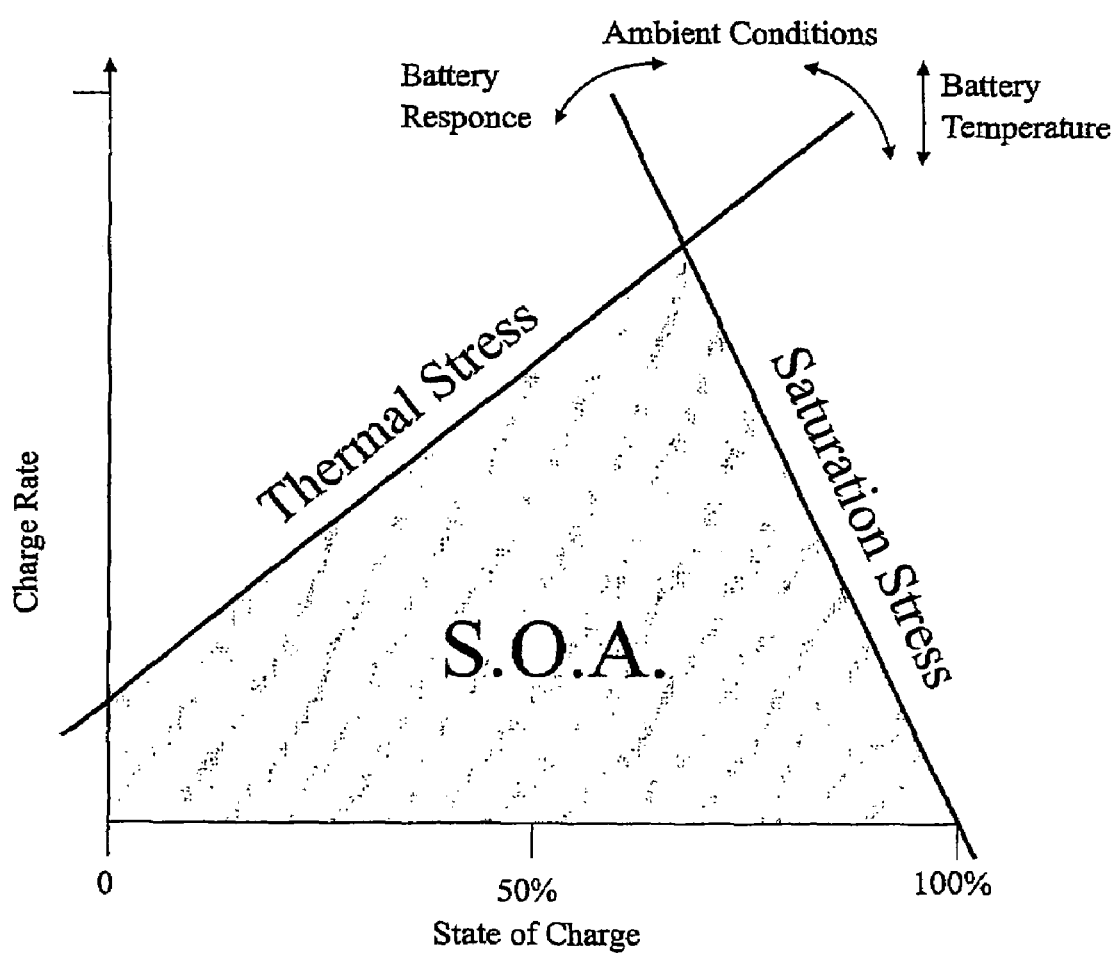
FIG. 13: illustrates the safe operating area for battery charge.

Through combining the previously described thermal and overcharge control schemes, a stress-controlled recharge system is obtained. The voltage and current limits of the recharge process are indirectly bounded through the stress imposed on the battery by the recharge. These boundaries can be dynamically adapted to the status of the battery throughout the charge. FIG. 13 shows a typical safe operating area (S.O.A.) for a VRLA battery at the start of recharge. The thermal and saturation stress limits shown in FIG. 13 are not fixed, these dynamically adjust as the state of charge of the battery increases throughout the recharge. The thermal stress control will select a charge current that, hopefully, remains constant throughout the recharge until the saturation stress limit is reached. As the battery temperature increases and the gap between the battery temperature and the allowed limit decreases, this produces a vertical shift down in the thermal stress boundary.

If the recharge is initiated from a low state of charge, the charge rate must be low to limit battery heating to an acceptable level. This is because the large amount of charge to be returned to the battery combined with the recharge inefficiency will cause significant heating. If the recharge is initiated from a higher state of charge, the charge may be returned at a higher rate as the allowed temperature rise can be achieved from a greater rate of heating for a shorter duration.

As the battery nears a full state of charge, its ability to accept the charge current (in the desired recharge reaction) is reduced. FIG. 13 also shows charge saturation limit. This allows a high charge rate at low states of charge and reduces to almost no charge (a float rate) when the battery is fully charged. While the charge saturation limit is shown as a straight line, the developed charge saturation control reduces the charge rate in steps when the onset of overcharge is detected.

Figure 14:
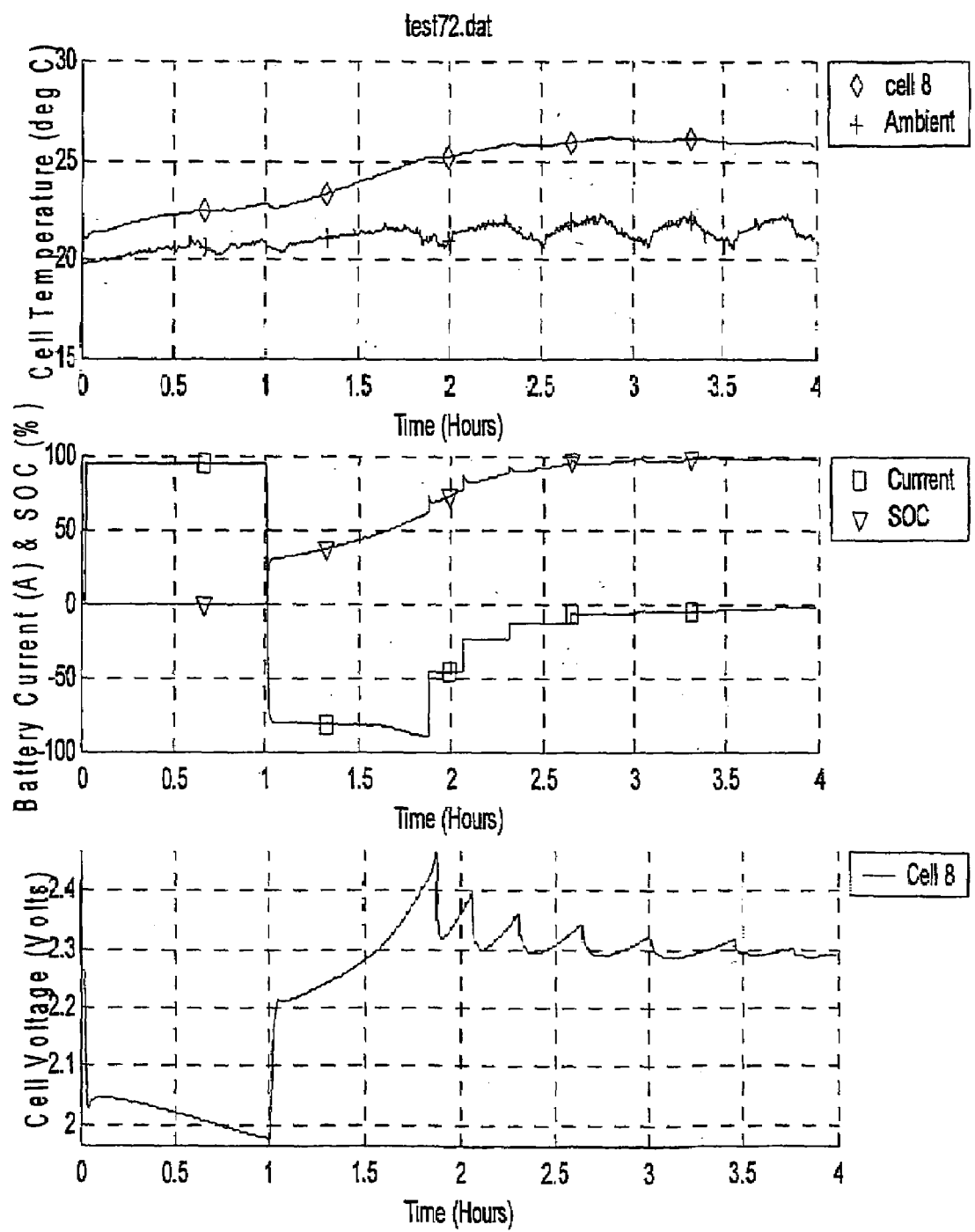
FIG. 14: illustrates cell parameters during a recharge employing aspects of the invention.

FIG. 14 illustrates the results of a combined thermal and overcharge control scheme. The centre plot shows that the charge current is essentially constant throughout the bulk charge. Near the end of this first constant current phase (at approximately 75 amps) there is a slight increase in charge current, this is due to the air-conditioning increasing the gap between the battery temperature and the ambient. This allows greater battery heating and hence the charge current increases.

When charge saturation is detected (at about 1.8 hours) the charge current was reduced by approximately 50%. The thermal control need no longer be used as current heating is significantly reduced. Not all the peaks in the voltage plot of FIG. 14 shows signs of charge saturation as this plot is of a single cell in a series string. The control strategy reduced the current as soon as a single cell showed signs of saturation, therefore eliminating overcharge of any cell. The scheme continues to reduce the current each time saturation is detected. In this way the battery can be returned to very near 100% state of charge with minimal saturation stress.

The 50% current reductions produce only small very short duration overestimates glitches in the state of charge estimates, demonstrating the ability to adjust to new conditions. Although no float voltage was set, the final voltage arrived at by the charge system (where current resolution limit was reached) was extremely close to the float voltage recommended by the battery manufacturer.

It will be apparent to the skilled addressee that the invention may be implemented in software in a Battery Management System. The hardware and scheme for such system are known in the art. The battery management system would be controlled by a computer, Programmable Logic Controller (PLC) or other micro-processor based controller. Transducers or distributed data-acquisition modules acquire the cell/battery voltages, current temperatures and ambient temperature and input these to the controller. Pre-determined reference information and pre-set reference criteria are stored in memory. The controller performs the required tasks and outputs control signals to charger hardware. The controller output may be a set-point to a discrete battery charger or other signal where the controller has more direct control over charge parameters such as current and voltage.

The described scheme will recharge a VRLA battery from any state of charge to a desired state of charge as quickly as the battery can accept the charge while maintaining it within the identified stress limitations. The described control schemes can easily be implemented in microprocessor or computer controlled battery chargers.

If a minimum battery capacity is required to guarantee system integrity, this may be used for the target state of charge instead of fully charged (100%). E.g. Using the allowed temperature rise to return the battery to 70% SOC (minimum capacity to guarantee system integrity) as quickly as possible, the final 30% of the charge may be returned at a slower rate as system reliability has been returned.

While the stress-managed recharge has been developed for rapid recharge use, it is applicable to any application or situation where charge is required without damaging the battery. For example, standby or cycling applications where the batteries must be returned to a high state of charge in a short time period.

Where in the foregoing description reference has been made to integers or elements having known equivalents, then such equivalents are herein included as if individually set forth.

A particular example of the invention has been described and it is envisaged that improvements and modifications can take place without departing from the scope thereof.

The invention claimed is:

1. A method of charging one or more cells including:
    measuring one or more cell parameters, or changes in said cell parameters;
    inputting the measured cell parameter(s) or changes in cell parameters into a state of charge estimation model;
    obtaining a state of charge of the cell(s) from the state of charge estimation model;
    selecting an allowable temperature rise for the cell(s);
    determining a charge parameter in accordance with the state of charge of the cell(s), and in accordance with the selected allowable temperature rise for the cell(s); and
    supplying energy to the cell(s) in accordance with the determined charge parameter.

2. A method according to claim 1 wherein energy is being supplied to the cell(s) when the cell parameter is measured.

3. A method according to claim 1 wherein the cell parameter and charge parameter are obtained periodically.

4. A method according to claim 1 further including establishing the state of charge estimation model by previous testing.

5. A method according to claim 1 further including calculating the charge parameter in such a way as to control temperature change of the cell(s) during supply of energy to the cell(s) within predetermined limits.

6. A method according to claim 1, wherein the charge parameter is a charge rate (current).

7. A method according to claim 1 further including acquiring calibration data relating to one or more variable cell parameter(s), or change in said parameter(s); characterising the calibration data to obtain reference information; and determining an amount of energy to be supplied to the cell(s), wherein the charge parameter is determined by relating the allowable temperature rise and energy to be supplied to the reference information.

8. A method according to claim 1 further including establishing the state of charge estimation model by:
acquiring a plurality of data relating one or more variable cell and/or ambient parameter(s), or change in said parameter(s), to state of charge of the cell(s); and
characterising the data to obtain a Fuzzy Logic state of charge estimation model.

9. A computer readable medium containing instructions to enable a computer or micro-processor to perform steps according to claim 1.

10. A method according to claim 7, wherein the amount of energy to be supplied is determined by comparing the state of charge obtained from the state of charge estimation model with a target state of charge.

11. A method according to claim 1, wherein determining a charge parameter in accordance with the state of charge of the cell(s), and in accordance with the selected allowable temperature rise for the cell(s) comprises:
determining a desired state of charge rise responsive to the determined state of charge of the cell(s); and
determining the charge parameter responsive to the determined state of charge rise and the selected allowable temperature rise in accordance with a charge selection model that expresses the charge parameter as a function of state of charge rise and temperature rise.

12. An apparatus configured to perform the method of claim 1.

13. A method of charging a battery, the method comprising:
monitoring at least one cell parameter of the battery;
determining a state of charge rise for the battery responsive to the monitored at least one cell parameter;
determining an allowable temperature rise for the battery;
determining a charge to be applied to the battery based on the determined state of charge rise and the determined allowable temperature rise according to a model that expresses the charge as a function of state of charge and temperature rise; and
applying the determined charge to the battery.

14. A method according to claim 13, wherein determining a charge comprises determining a charge rate.

15. An apparatus configured to perform the method of claim 13.

16. A computer program product comprising computer program code embodied in a storage medium, the computer program code comprising program code configured to perform the method of claim 13.

* * * * *

UNITED STATES PATENT AND TRADEMARK OFFICE
CERTIFICATE OF CORRECTION

PATENT NO. : 8,040,110 B2  Page 1 of 1
APPLICATION NO. : 10/477534
DATED : October 18, 2011
INVENTOR(S) : Al-Anbuky et al.

It is certified that error appears in the above-identified patent and that said Letters Patent is hereby corrected as shown below:

On the Title Page:
Item (56), References Cited, Foreign Patent Documents, Page 2, Line 11
Please delete "WO98/40950  9/1998"
References Cited, Foreign Patent Documents:
Please add -- WO98/40951  9/1998 --

Signed and Sealed this
Thirty-first Day of January, 2012

David J. Kappos
*Director of the United States Patent and Trademark Office*